(12) United States Patent
Viorel et al.

(10) Patent No.: US 8,559,388 B2
(45) Date of Patent: Oct. 15, 2013

(54) SELF ORGANIZING NETWORK

(75) Inventors: Dorin Viorel, Calgary (CA); Changqin Huo, Calgary (CA); Masato Okuda, Saitama (JP); Wei-Peng Chen, Santa Clara, CA (US); Chenxi Zhu, Gaithersburg, MD (US)

(73) Assignee: Fujitsu Semiconductor Limited, Yokohama-shi (JP)

( * ) Notice: Subject to any disclaimer, the term of this patent is extended or adjusted under 35 U.S.C. 154(b) by 773 days.

(21) Appl. No.: 12/480,368

(22) Filed: Jun. 8, 2009

(65) Prior Publication Data

US 2009/0312022 A1    Dec. 17, 2009

Related U.S. Application Data

(60) Provisional application No. 61/061,500, filed on Jun. 13, 2008, provisional application No. 61/190,975, filed on Sep. 4, 2008.

(51) Int. Cl.
    *H04W 4/00* (2009.01)
(52) U.S. Cl.
    USPC .......................................... 370/331; 370/338
(58) Field of Classification Search
    USPC .......................................... 370/329, 331, 338
    See application file for complete search history.

(56) References Cited

U.S. PATENT DOCUMENTS

| | | | |
|---|---|---|---|
| 6,628,933 B1* | 9/2003 | Humes | 455/404.1 |
| 6,859,654 B1* | 2/2005 | Reynolds et al. | 455/437 |
| 2004/0203855 A1* | 10/2004 | Veerasamy et al. | 455/456.1 |
| 2005/0101328 A1* | 5/2005 | Son et al. | 455/436 |
| 2005/0101329 A1* | 5/2005 | Gallagher | 455/436 |
| 2007/0087756 A1* | 4/2007 | Hoffberg | 455/450 |
| 2008/0057955 A1* | 3/2008 | Choi-Grogan | 455/435.1 |
| 2008/0132239 A1* | 6/2008 | Khetawat et al. | 455/438 |
| 2009/0052395 A1* | 2/2009 | Bao et al. | 370/331 |
| 2009/0061873 A1* | 3/2009 | Bao et al. | 455/436 |
| 2009/0092078 A1* | 4/2009 | Czaja et al. | 370/328 |
| 2009/0092080 A1* | 4/2009 | Balasubramanian et al. | 370/328 |
| 2009/0092081 A1* | 4/2009 | Balasubramanian et al. | 370/328 |
| 2009/0129341 A1* | 5/2009 | Balasubramanian et al. | 370/331 |
| 2009/0144167 A1* | 6/2009 | Calamera | 705/26 |
| 2009/0262015 A1* | 10/2009 | Kim et al. | 342/357.09 |
| 2010/0216405 A1* | 8/2010 | Bhadra et al. | 455/63.1 |
| 2010/0220621 A1* | 9/2010 | Li et al. | 370/252 |
| 2011/0051684 A1* | 3/2011 | Li et al. | 370/331 |
| 2012/0046028 A1* | 2/2012 | Damnjanovic et al. | 455/423 |
| 2012/0302261 A1* | 11/2012 | Tinnakornsrisuphap et al. | 455/456.4 |
| 2013/0064218 A1* | 3/2013 | Sundaresan et al. | 370/330 |

OTHER PUBLICATIONS

DRAFT Standard for Local and Metropolitan Area Networks, Part 16: Air Interface for Broadband Wireless Access Systems, P802.16 Rev2/D7 Oct. 2008, © 2008 IEEE (2080 pgs.).
Viorel et al., U.S. Appl. No. 12/480,330, filed Jun. 22, 2009, *Self Organizing Network* patent application.

* cited by examiner

*Primary Examiner* — Farah Faroul
(74) *Attorney, Agent, or Firm* — Baker Botts L.L.P.

(57) ABSTRACT

A method for implementing a self organizing network includes establishing a connection between a femto base station and a network access device operable to provide the femto base station with Internet access. The method also includes establishing a backhaul connection between the femto base station and a wireless service provider's network via the Internet. The method further includes establishing a wireless connection with one or more endpoints via a radio frequency (RF) channel. The method additionally includes transmitting, from the femto base station to the wireless service provider's network, neighborhood RF interference information via the backhaul connection. The method also includes receiving RF channel re-provisioning information from the wireless service provider's network and re-provisioning the RF channel. The method further includes participating in a hand-off procedure to hand-off the endpoints to the re-provisioned RF channel.

20 Claims, 5 Drawing Sheets

SELF ORGANIZING NETWORK

CROSS-REFERENCE TO RELATED APPLICATION

This application claims the benefit of priority under 35 U.S.C. §119(e) of U.S. Provisional Application Ser. No. 61/061,500 filed Jun. 13, 2008 and Ser. No. 61/190,975 filed Sep. 4, 2008.

TECHNICAL FIELD

The present invention relates generally to wireless networking, and more particularly to a self organizing network.

BACKGROUND

IEEE 802.16 is an emerging suite of standards for Broadband Wireless Access (BWA) commonly known in the wireless industry as WiMAX. WiMAX is one of the wireless technologies targeting the fourth generation of wireless mobile systems. The IEEE 802.16e amendment to the IEEE 802.16 base specification enables combined, fixed, and mobile operation in licensed and license-exempted frequency bands under 11 GHz. IEEE 802.16 defines the air interface used for data centric wireless networks. 802.16 is aimed at high mobility applications and designed to manage the quality of service (QoS) provided over the air.

The basic WiMAX network coverage is provided using an approach similar to other mobile wireless technologies (e.g., using high power macro base stations that may be grouped in a cluster of cells). In order to increase the intra-cell coverage and capacity, distributed small base station entities have been considered. Depending on the number of target users and the type of applications envisioned, these small base station entities have been defined by the WiMAX industry as nano, pico or femto base stations. Relay stations (RS) have also been introduced to extend radio coverage or to increase the throughput of a macro base station (mBS). An RS, which transfers data of active service flows between an mBS and mobile stations (MS), may be a low-cost alternative to an mBS.

The femto base station (fBS) is the smallest base station entity. An fBS is, in essence, a small WiMAX mBS that a user can purchase and install in his home or office. It provides the user's MS with the basic air interface functions of an mBS based on the IEEE 802.16 standard. Compared to an mBS, the fBS is a low-cost, low-power radio system that may be used by users in a relatively low mobility environment. The users can install the fBS in their building and connect it to their fixed broadband networks (e.g., cable, xDSL or DSL) to provide the fBS with its backhaul communication line. In this regard the fBS enables fixed/mobile convergence, providing the fixed user with mobility and increasing the spectral efficiency (e.g., improving the coverage) of the mobile user. Being located in the user's building, the fBS provides higher signal strength and better link quality than the MS would get from the mBS outside the user's building.

SUMMARY

The teachings of the present disclosure relate to a method for implementing a self organizing network that includes establishing a connection between a femto base station and a network access device operable to provide the femto base station with Internet access. The method also includes establishing a backhaul connection between the femto base station and a wireless service provider's network via the Internet. The method further includes establishing a wireless connection with one or more endpoints via a radio frequency (RF) channel. The method additionally includes transmitting, from the femto base station to the wireless service provider's network, neighborhood RF interference information via the backhaul connection. The method also includes receiving RF channel re-provisioning information from the wireless service provider's network and re-provisioning the RF channel. The method further includes participating in a hand-off procedure to hand-off the endpoints to the re-provisioned RF channel.

The teachings also relate to a method for implementing a self organizing network that includes establishing a backhaul connection with a femto base station. The method further includes receiving, from the femto base station, neighborhood radio frequency (RF) interference information via the backhaul connection. The method also includes creating an RF environment map. The method additionally includes determining whether the femto base station is to re-provision its RF channel. Upon determining that the femto base station is to re-provision its RF channel the method includes transmitting information indicative of the re-provisioning to the femto base station and participating in a hand-off procedure to hand-off any endpoints currently connected to the femto base station to the re-provisioned femto base station.

Technical advantages of particular embodiments include defining steps that may be taken to allow an fBS to operate within a servicing wireless network (e.g., a WiMAX network) when connected to a public access network (like xDSL or cable network) for its backhaul connection. Accordingly, an fBS may be able to remotely connect to and be authenticated by a servicing WiMAX network. Another technical advantage of particular embodiments includes using a self provisioning algorithm that may enable the fBS to adjust its RF, MAC, and PHY parameters in such a way that minimizes the RF interference in the respective cluster of cells while maximizing the cell traffic capacity Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
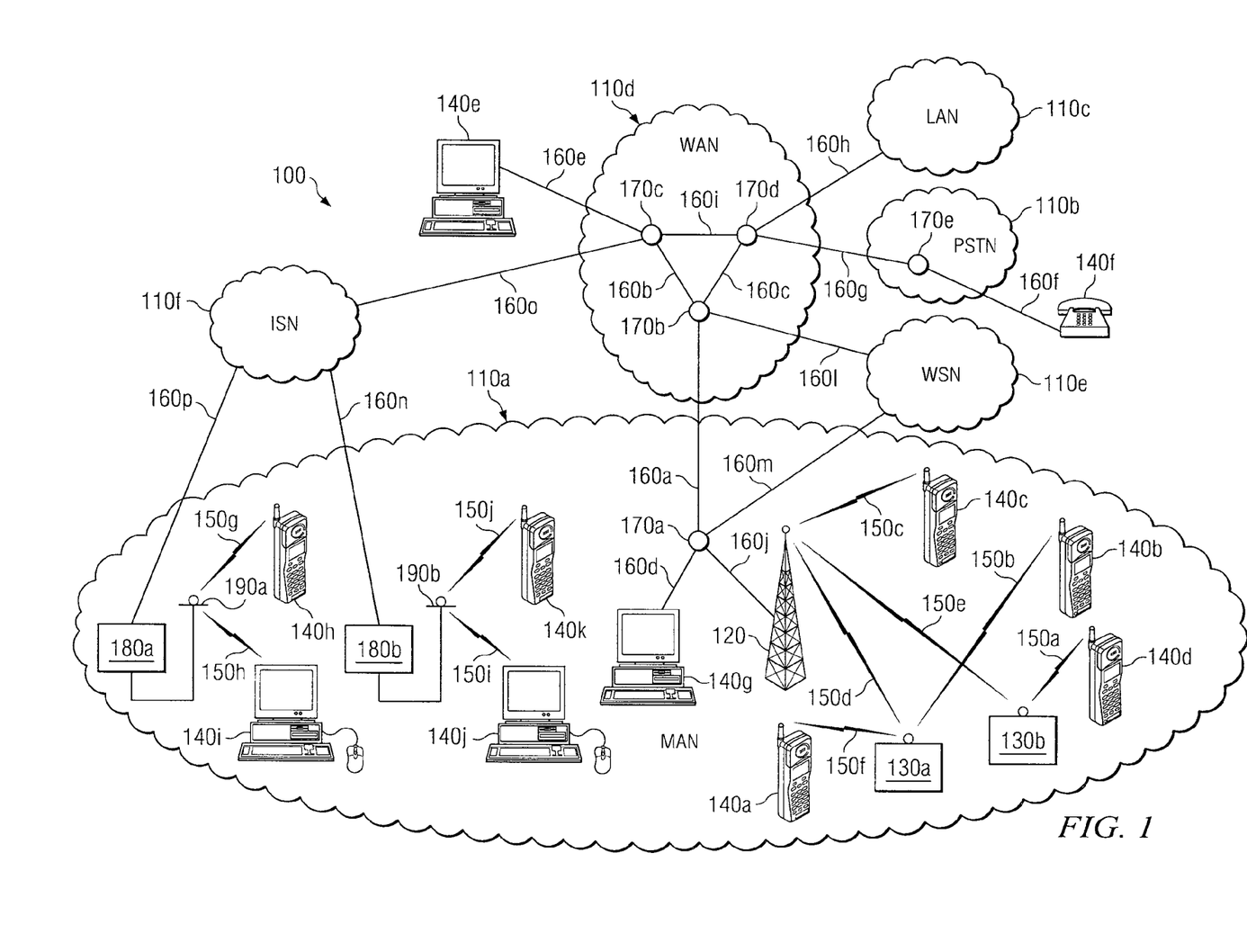
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an 802.16 based wireless network, popularly known as WiMAX, which may include macro base stations (mBSs), such as mBS 120, relay stations (RSs), such as RSs 130, and femto base stations (fBSs), such as fBSs 190.

For simplicity and ease of discussion, the remainder of this description may use a simplified nomenclature for the various entities that may be involved. 'Owner' may refer to the entity that has purchased an fBS or to whom the fBS is registered. 'User' may refer to the entity to whom a wireless service is being provided. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection. 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. 'Wireless access provider' (WAP) may refer to the WSP providing the fBS with access to a wireless network. In many instances the WAP will be the owner's WSP, but the WAP may be a foreign WSP (e.g., if the owner takes his fBS to a new city where the owner's WSP does not operate but has a service level agreement (SLA) in place with the foreign WSP). While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

In the embodiment depicted in FIG. 1, network 110a includes fBSs 190. fBSs 190 may, in essence, be small base stations purchased (or leased) by the owner from their WSP. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

The fBS is envisioned as being installed at the owner premise by the owner with little or no support from their WSP. This is different than other types of small base station entities, which are typically installed and commissioned by the WSP. Since fBSs are operated in a home or office environment, it may be natural to consider fBSs 190 as private equipment accessible only by the owners' endpoints 140. However, in certain situations the owner of an fBS may provide wireless service to endpoints 140 of non-owners. Such fBSs may be referred to as public accessible fBSs.

Because the owner may purchase the fBS from a WSP and install it in their home, or virtually at any location with a broadband connection, the WSP may have little or no control over the location of fBSs 190. Accordingly, the WSP may attempt to determine the location of fBS 190 as part of an fBS initialization and operation procedure. There may be at least two considerations that a WSP may have with respect to the location of the fBS:

1.) The fBS may only be authorized to operate in a geographic area where the WSP has a license to use the RF spectrum (or a SLA with another WSP that has a license). Accordingly, the operator may need to know the location of the fBS with an accuracy of kilometers to meet the spectrum license related location requirement;

2.) The WSP may need to know the position of an fBS, within 100 m, in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels.

Fixed-mobile convergence (FMC) is the scenario where users can enjoy service continuity and service integration when they roam between outdoor and indoor environments. fBSs 190 may facilitate FMC by allowing endpoints 140 to use a single wireless interface. More specifically, once fBS 190b, for example, is installed in the owner's home he is able to use the same mobile device with the same wireless interface to connect to either mBS 120 outside or fBS 190b inside. The selection of which device to connect to can be made manually by the user or autonomously by endpoint 140k, BS 120, or any component coupled to or controlled by wireless service network (WSN) network 110e.

Part of the installation process for the fBS may include providing it with Internet access for its backhaul connection. In the scenario depicted in FIG. 1, fBSs 190 are connected to network access devices 180. This connection may provide fBSs 190 with their backhaul connection to the WSP's network, WSN network 110e. Network access device 180 may provide the owner with general Internet access. fBSs 190 do not use dedicated back-haul communication lines associated with the WSP, but rather use the owner's existing Internet access. Depending on the embodiment and scenario the ISP and the WSP may be the same entity.

While fBSs 190 may use the owner's existing Internet access, similar to a traditional local area network wireless access point (e.g., a WiFi access point), as a user leaves the fBS's coverage area they may be handed-off to RS 130 or mBS 120. The hand-off may be possible because the user's endpoint is able to use the same wireless interface with RS 130 or mBS 120 that it uses with fBS 190. Furthermore, unlike a traditional WiFi wireless access point, operated in a license-exempt band, the fBS may typically be operated in a licensed band.

Within a network using a wireless protocol (e.g., 802.16e, or 802.16m), such as network 110a, particular embodiments may allow for fBSs 190 to be public or private. A public fBS may allow any of endpoints 140 to connect thereto; a private fBS may only allow connections from those endpoints 140 who are authorized to connect thereto. For example, fBS 190a may be a private fBS that the owner has installed in his home. The owner of fBS 190a may have authorized endpoints 140h and 140i (which may, for example be his phone (e.g., a mobile phone) and his laptop computer) to connect to fBS 190a.

Accordingly, only these two endpoints may connect to fBS 190a. On the other hand, fBS 190b may be a public fBS, installed at a business. Accordingly, any of endpoints 140 within the coverage area of fBS 190b may connect thereto.

Each of endpoints 140 is connected to one of mBS 120, RSs 130, or fBSs 190. For simplicity, the component to which an endpoint is connected may be referred to as an access station. For example, the access station for endpoint 140e is fBS 190a. Between each endpoint 140 and its respective access station there may be a wireless connection 150, sometimes referred to as an access link. These wireless connections may be referred to as access links because they provide the endpoint with access to a network. Similarly, between each RS and mBS (or between two RSs) there may be a wireless connection 150, sometimes referred to as a relay link. This wireless connection may be referred to as a relay link because it relays communications between the access links and the mBS.

A wireless connection may comprise various wireless resources such as, for example, a combination of a particular center frequency, a particular bandwidth, a particular time slot, and/or a particular subchannel or group of subchannels (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. This may cause a decrease in quality of service (QoS) and an increase in maintenance costs. This may be of particular concern with respect to a large rollout of fBSs 190. More specifically, because the owner installs the fBS, there is no way for the WAP to perform any prior frequency planning and/or site surveillance. Accordingly, it may be desirable to know where a particular fBS has been configured. In particular embodiments, uplink sounding may be used to estimate the channel gain and interference strength between mBS 150, and multiple RSs 130 and fBSs 190. The uplink sounding may, therefore, be used in determining the quality and/or efficiency of the various wireless connections. This information may be used to facilitate in allowing the fBS to operate with little or no local intervention.

In particular embodiments, endpoints 140 may select which access station (e.g., one of mBS 120, RSs 130, or fBSs 190) to connect to based-on, and in order to increase, at least in part, the spectrum efficiency of an access link for the respective access station. The spectrum efficiency may be determined using the Modulation and Coding Scheme (MCS) level which may be determined by the Carrier to Interference-plus-Noise Ratio (CINR) of the wireless connection and may be measured in units of bits/Hz/sec. For example, a Quadrature Phase-Shift Keying (QPSK) modulated signal with code rate 1/2, may have a spectrum efficiency of 1 bit/Hz/second.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN (e.g., a voice based network); network 110c is a LAN; network 110d is a WAN (e.g., a long range optical network or the Internet); WSN network 110e may be operated by the WSP responsible for providing network 110a with wireless service (e.g., WiMAX); and Internet service network (ISN) network 110f may be operated by the ISP responsible for providing its users with Internet access. Though not depicted in FIG. 1, both WSN network 110e and ISN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISN network 110f and WSN network 110e into a single network. Furthermore, the interconnections between networks 110 may vary from those depicted in FIG. 1. For example, if an owner uses Digital Subscriber Line (DSL) for his internet access, his fBS may connect through PSTN 110b.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more RSs and fBSs, in certain cases, may allow network 110a to cover the larger geographic area associated with a MAN while using a relatively small number of wired links. More specifically, by properly arranging mBS 120, multiple RSs 130 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of WSN network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WIMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's Internet access, provided by the owner's ISP via the ISP's network (e.g., ISN network 110f), for its backhaul connection to the WSP's network (e.g., WSN network 110e).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a. As a mBS, node 170a may be able to establish several wireless connections of its own with various other mBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, node 170e may translate communications between the various protocols used by networks 110b and 110d.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
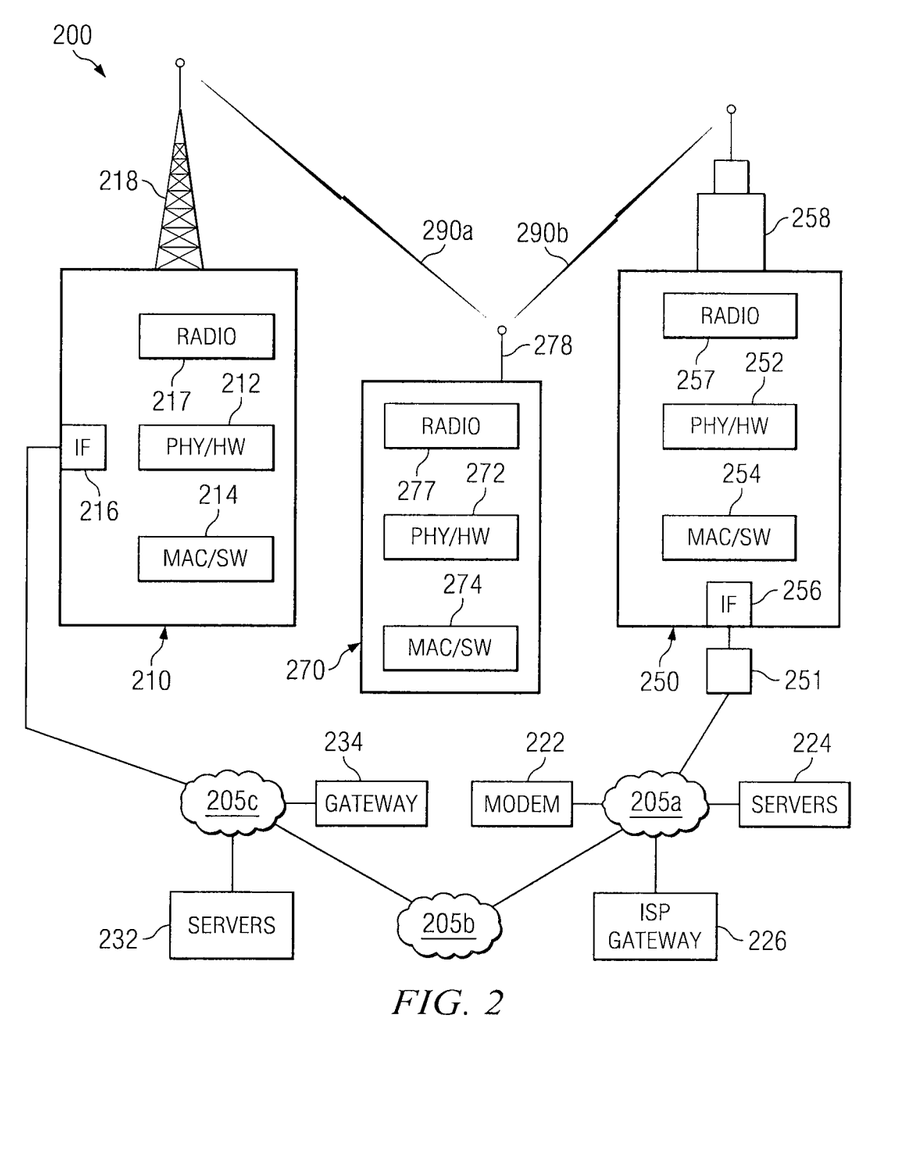
FIG. 2 illustrates a wireless network comprising a more detailed view of an endpoint, a base station and a femto base station, in accordance with a particular embodiment.

FIG. 2 illustrates a wireless network comprising a more detailed view of an endpoint, a mBS and a fBS, in accordance with a particular embodiment. More specifically, the depicted embodiment is a simplified scenario comprising networks 205, mBS 210, fBS 250 and endpoint 270. In different embodiments network 200 may comprise any number of wired or wireless networks, mBSs, endpoints, RSs, fBSs, and/or any other components that may facilitate or participate in the communication of data and/or signals whether via wired or wireless connections. mBS 210 and fBS 256 comprise PHY/HW blocks 212 and 252, MAC/SW block 214 and 254, communication interfaces 216 and 256, radios 217 and 257 and antennas 218 and 258. Similarly, endpoint 270 comprises processor 272, memory 274, radio 277, and antenna 278. These components may work together in order to provide wireless networking functionality, such as providing endpoints with wireless connections in a wireless network (e.g., a WiMAX wireless network).

Networks 205 may comprise separate but interconnected networks operated by one or more different operators. More specifically, network 205a may be the ISP's network, network 205b may be a public network (e.g., the Internet), and network 205c may be the WSP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b. In particular embodiments, ISP Gateway 226 may route data and control information related to a one or more femto-cells to the WSP through the ISP backhaul network.

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b.

Networks 205a and 205c may be coupled via network 205b. In some embodiments, network 205b may an IP connection (e.g., the Internet). Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

PHY/HW blocks 212, 252 and 272 may include any hardware needed for the operation of mBS 210, fBS 250, and endpoint 270, respectively. For example, PHY/HW blocks 212, 252 and 272 may each comprise one or more processors. Each processor may be a microprocessor, controller, application specific integrated circuit (ASIC), field programmable gate array (FPGA), or any other suitable computing device, resource, or combination of hardware, software and/or encoded logic operable to provide, either alone or in conjunction with other components, (e.g., memory) wireless networking functionality. Such functionality may include providing various wireless features discussed herein. For example, one or more of the processors within PHY/HW blocks 212, 252 and 272 may be able to determine the spectrum efficiency of one or more of wireless connections 290.

As another example, PHY/HW blocks 212, 252 and 272 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by mBS 210, fBS 250, and endpoint 270, respectively, including software embedded in a computer readable medium, and/or encoded logic incorporated in hardware or otherwise stored (e.g., firmware). For example, the memory modules may store information regarding the spectrum efficiency of one or more particular links. Additional examples of information stored by the memory modules will be discussed below.

MAC/SW blocks 214, 254, and 274 may include any software, logic, or other information needed for the operation of mBS 210, fBS 250, and endpoint 270, respectively. In particular embodiments, the software, logic or other information may be stored within the memory modules of PHY/HW blocks 212, 252 and 272. For example, MAC/SW blocks 214, 254, and 274 may comprise, stored within the respective memory modules, logic that when executed by PHY/HW block is operable to implement its respective portion of a self organizing network, as discussed in more detail below.

Radios 217, 257, and 277 may be coupled to or a part of antennas 218, 258, and 278, respectively. Radios 217, 257, and 277 may receive digital data that is to be sent out to other mBSs, fBSs, RSs and/or endpoints via a wireless connection. Radios 217, 257, and 277 may convert the digital data into a radio signal having the appropriate center frequency and bandwidth parameters. These parameters may be predetermined, for example, by a combination of PHY/HW block 212 and MAC/SW block 214 of mBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by PHY/HW blocks 212, 252, or 272 and/or MAC/SW blocks 214, 254, or 274 as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between mBS 210 and networks 205, and between fBS 250 and networks 205. For example, communication interface 216 may perform any formatting or translating that may be needed to allow mBS 210 to send and receive data from network 205c over a wired connection. As another example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205c, as opposed to the WiMAX service provider supplying the backhaul connection as is the case with mBS 210.

Network access device 251 may be used to provide the owner with Internet access. fBS 250 may utilize the Internet access for its backhaul connection to WiMAX network 205c. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251.

As part of establishing a backhaul connection, fBS 250 may communicate with network access device 251. Network access device 251, which may be provided or authorized by the user's ISP, may provide fBS 250 with access to the ISP's network 205a which may then allow access to network 205c, via network 205b. Accessing network 205a may involve modem 241 communicating with the ISP's modem 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 290b with endpoint 270.

Endpoint 270 may be any type of wireless endpoint able to send and receive data and/or signals to and from mBS 210 and/or fBS 250. Some possible types of endpoints 270 may include desktop computers, PDAs, cell phones, smart phones, laptops, and/or VoIP phones.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several mBSs to provide wireless access for a metropolitan area, or a single mBS may be used with several RSs to provide the necessary coverage. Furthermore, in some embodiments, fBS 250 may have more or less radios. Some embodiments may include additional features.

Figure 3:
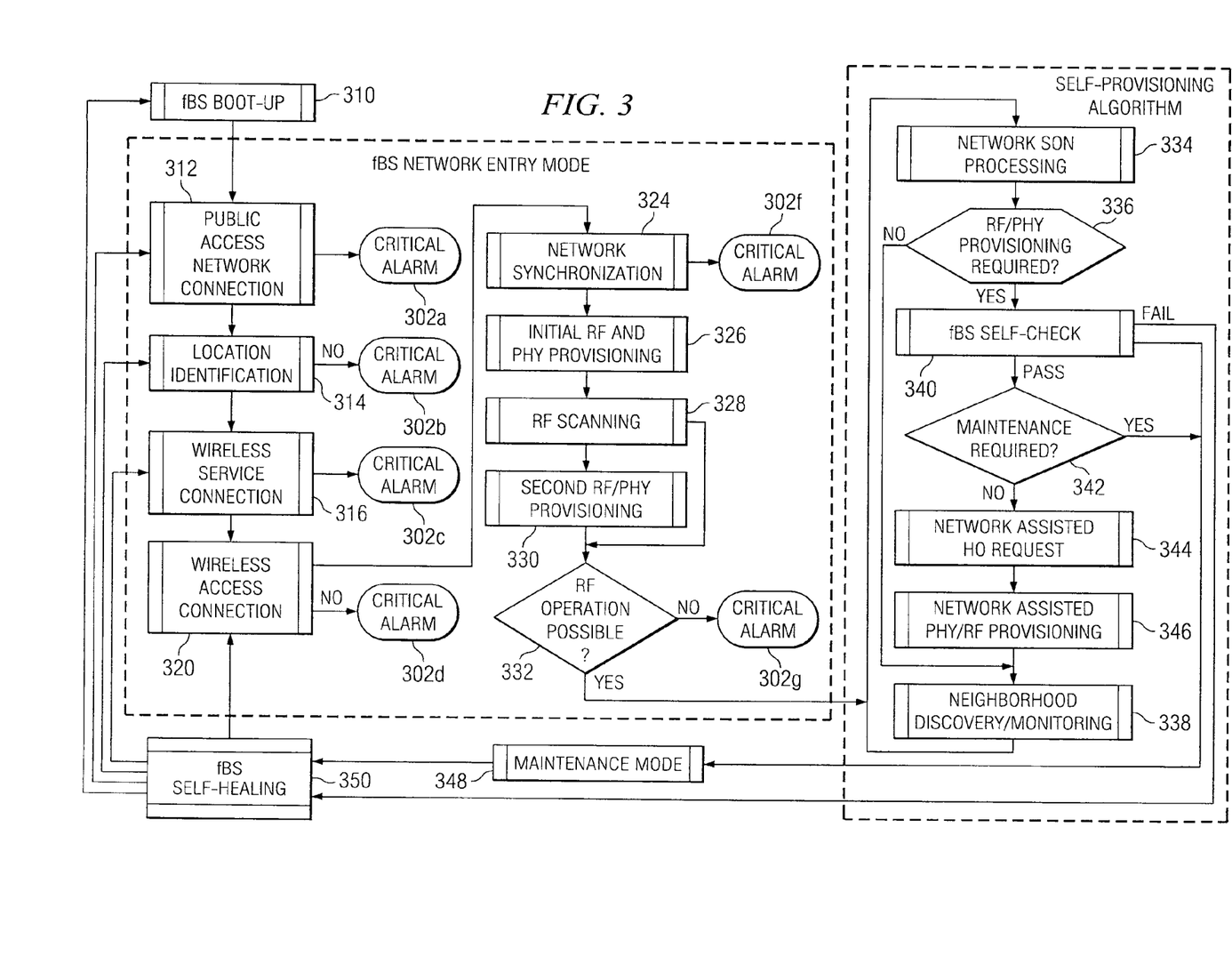
FIG. 3 illustrates a method for implementing a self organizing network, in accordance with a particular embodiment.

FIG. 3 illustrates a method for implementing a self organizing network, in accordance with a particular embodiment. As discussed above, one of the concerns with allowing individual owners to purchase and install their own fBS is how to ensure that the fBS does not cause interference for, or experience interference from, neighboring BSs, fBSs, and/or RSs. Accordingly, particular embodiments may utilize a Self Organizing Network (SON) algorithm to assist in the provisioning of fBSs. The SON algorithm may aid the fBS in being provisioned with an optimized set of radio frequency (RF) and physical layer (PHY) parameters (e.g., channel frequency, RF output power, segment). This may help to improve the intra-cell quality of service (QoS) by minimizing the intra-cell and inter-cell interference.

As can be seen in FIG. 3, the method may be divided into multiple stages, such as an fBS Network Entry Mode (NEM) stage and a Self-Provisioning Algorithm (SPA) stage. Before an fBS can enter either of the two stages it may need to first boot-up, as shown at step 310. Step 310 may begin once the fBS receives power and/or has otherwise been turned-on. During boot-up the fBS may execute a predetermined set of procedures that may load, in a pre-defined sequence, any software applications desired or needed for the proper operation of the hardware and software of the fBS. The applications that are loaded, and the order in which they are loaded, may vary depending on the particular implementation.

Regardless of the order or specifics of the procedures implemented by the fBS during boot-up at step 310, once step 310 is complete the fBS may be functional such that any software applications that may be needed may be loaded into memory (e.g., memory 254) and the fBS may be ready to start the fBS NEM stage. However, while the hardware and software may be ready to operate, the fBS may not actually begin operations until it has completed the NEM stage and/or at least one cycle (or a portion thereof) of the SPA stage. This may help to minimize the QoS impact created by the initial use of the fBS in light of the potentially uncontrolled interference possible from an fBS. In particular embodiments, the fBS may leave its RF transmitter power turned off until at least the NEM stage is complete.

The first step in the fBS NEM stage is step 312 in which the fBS attempts to connect to a public access network, such as ISN network 110f described above with respect to FIG. 1. This connection provides the fBS with its backhaul connection to the appropriate WSP's network. As discussed above, the backhaul connection may use the owner's own general use Internet access (e.g., the Internet access that the owner may use with his computer to access the Internet) provided by an ISP. Depending on the embodiment, the public access network connection may be provided through xDSL, cable, or any other suitable and/or available broadband network access means. While step 312 specifies that the fBS is connected to a public access network, it may be that the fBS is connected to a leased or private access communication network.

Regardless of the type of network access that is used, the fBS or the network access device to which the fBS is connected may typically need to establish a connection (including, e.g., receiving an IP address) with the ISP's network in order to proceed. In some embodiments, the fBS may test the connection by pinging a known web-site. If the connection fails, the fBS device may raise a critical alarm at step 302a. In certain embodiments, the fBS may make a predetermined number of attempts before raising the critical alarm and/or exiting the network entry procedure. The connection may fail for a variety of reasons. For example, the fBS may not be physically connected to the network access device, the network access device may not be physically connected to the ISP's network, the fBS may not be authorized with the network access device, the owner's account with the ISP may be not be valid, or any other of a number of reasons.

At step 314 the fBS may attempt to identify its location (hereinafter location ID). In certain embodiments the location ID of the fBS may be needed for the fBS to be authenticated by the WSP and/or the WAP. This may be for spectrum allocation purposes (discussed below). The location ID may also aid in preventing an fBS purchased from network operator A from being deployed within a different spectrum coverage area owned by network operator B (when no SLA is in place between operators A and B). The location ID may further be used by the fBS to provide support for certain emergency services (e.g., E911).

The location ID may comprise the geographical position or location of the fBS. There are a variety of ways in which the fBS may be able to determine its location. For example, the fBS may include a global positioning system (GPS) device from which the fBS can determine its location. As another example, the fBS may be able to use its IP address to determine its approximate location. The accuracy of the location ID may be implementation dependent and possibly dictated by national regulations. In some embodiments, the accuracy of the location ID may improve over time and/or with operation. In some embodiments, such as where the fBS is being tested by an application or development engineer, step 314 may be skipped.

If the fBS is not able to determine its location ID, or is unable to attain the location ID with a requisite level of geographical accuracy, then the fBS may raise a critical alarm at step 302b. At this point the fBS may exit the fBS network entry procedure. In certain embodiments, the fBS may make a predetermined number of attempts before raising the critical alarm and/or exiting the network entry procedure.

Figure 4:
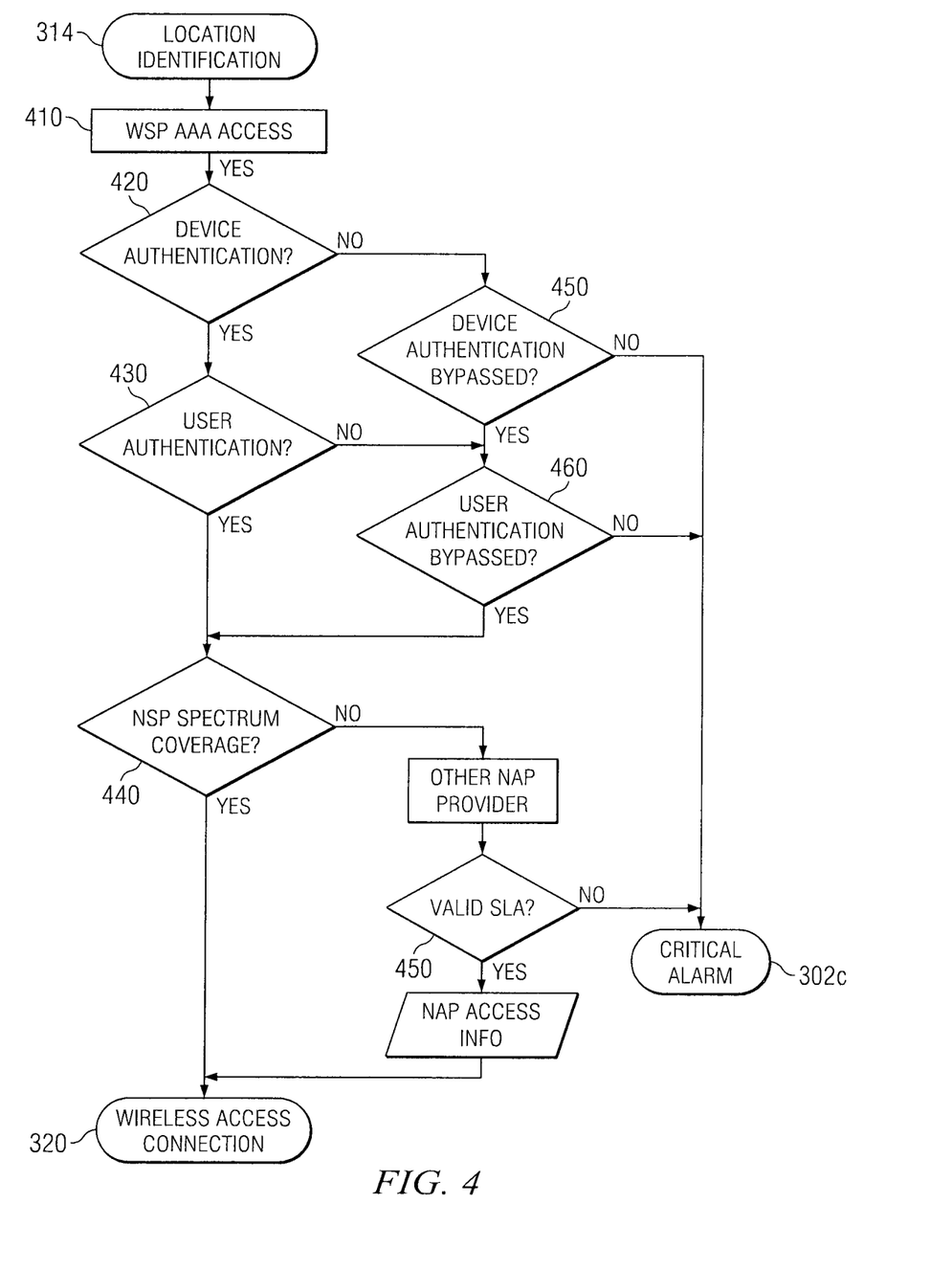
FIG. 4 illustrates a method for implementing a wireless service connection, in accordance with a particular embodiment.

Once the fBS has established network access and the location ID has been determined, the fBS may attempt to connect to the WSP's network at step 316. In particular embodiments, the fBS may be sold by a particular WSP that may pre-provision the fBS with various information. For example, the WSP may pre-provision the fBS with one or more of the RF spectrum channels related to the WSP, an IP address of a security gateway for the WSP, an IP address of a related AAA server for the WSP, and any needed security parameters required to access the WSP's network. The fBS may use all, some, or none of this information in attempting to connect to the WSP's network. As previously mentioned, the WSP may be the same or a different provider than the ISP. For example, a user may have WiMAX service from a first provider and Internet access from a second provider. As another example, a user may have WiMAX service and Internet access from the same provider. FIG. 4, discussed below, provides additional details for implementing a wireless network connection, in accordance with a particular embodiment.

If the fBS is unable to connect to the WSP's network, for any reason (e.g., any of the reasons provided above with respect to connecting to the ISP's network), a critical alarm may be raised at step 302c. A critical alarm may also be raised if the reported location of the fBS is unknown. As before, the fBS may make a predetermined number of attempts to connect to the WSP's network before it raises the critical alarm, exits the network entry procedure or wireless network connection step, and/or begins self healing at step 350.

Figure 5:
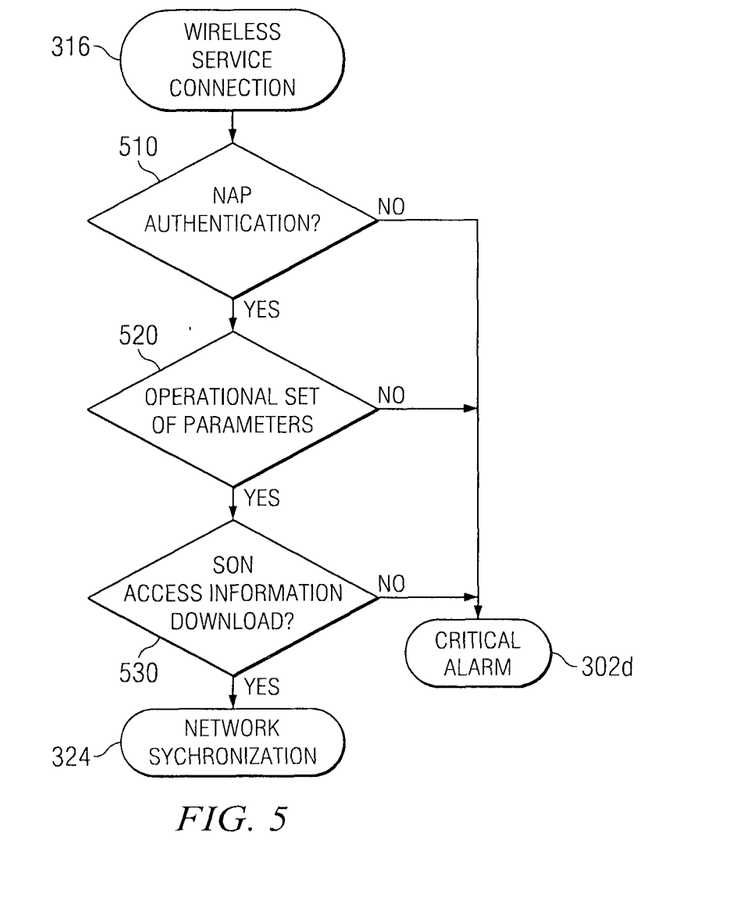
FIG. 5 illustrates a method for implementing a wireless access connection, in accordance with a particular embodiment.

At step 320 the fBS connects to the wireless access network. Depending on the location of the fBS, the WAP may be the user's WSP or a foreign WSP. FIG. 5, discussed below, provides additional details for implementing a wireless access connection, in accordance with a particular embodiment.

If the fBS is unable to connect to the wireless access network, for any reason, a critical alarm may be raised at step 302d. As before, the fBS may make a predetermined number of attempts to connect to the wireless access network before it raises the critical alarm, exits the network entry procedure or wireless network access step, and/or begins self healing at step 350.

At step 324 the fBS begins network synchronization with the WAP's wireless network. This may include the fBS becoming synchronized in time with the WAP's master WiMAX network. Network synchronization may be achieved using any of a variety of techniques. For example, if the fBS is equipped with a GPS device, and the GPS device is able to receive a satellite signal, then the timing signal within the GPS signal may be used for synchronization. As another example, the fBS may synchronize over the public access network it is using for its backhaul connection using, for example IEEE 1588. It may be assumed that the IEEE 1588 master clock is a GPS synchronized clock. Network synchronization may allow the fBS to align its transmittal of frames with the transmittal of frames by any neighboring access stations. This may prevent preamble symbols from being aligned with non-preamble symbols. Accordingly, the risk of potentially causing interference for endpoints trying to receive data in an overlapping coverage area may be reduced. In particular embodiments, the preamble symbols may have the highest power within a frame and they may occupy the largest bandwidth (compared with the other symbols of the frame). Thus, if a preamble symbol were to be transmitted simultaneously with a non-preamble symbol it may overpower the non-preamble symbol.

In particular embodiments, the accuracy of the time synchronization range may be related to the type of mobility scenario typically serviced by the fBS. For example, an indoor fBS may be expected to service low mobility users and thus the network time synchronization range may be relaxed compared with an outdoor fBS expected to service high mobility users.

If the fBS is not able to synchronize or no network synchronization is detected, then at step 302f the fBS may raise a critical alarm and exit the network entry procedure. In certain embodiments, the fBS may make a predetermined number of attempts before raising the critical alarm and/or exiting the network entry procedure.

At step 326 the initial RF and PHY provisioning is performed. The provisioning may be based on RF and PHY parameters that the fBS receives from the SON server associated with the WAP. The provisioning may be done while considering the spectrum coverage provided at the respective location. For example, if the fBS is in a foreign location (e.g., a location covered by a foreign WSP) then the basic RF and PHY parameters may be provided by the foreign WSP.

At step 328, the fBS performs RF scanning. In particular embodiments, the fBS may run an initial RF scan of the allocated RF spectrum (e.g., the RF spectrum provided by the WAP based on the fBS's location). Limiting the RF scan to the allocated RF spectrum may reduce the amount of time needed to complete the scan. During the RF scan the fBS may be attempting to assess the RF environment in which it is to operate. For example, where the fBS is a WiMAX fBS, it may be desirable for the fBS to detect and measure the Received Signal Strength Indication (RSSI) or Carrier to Interference-plus-Noise Ratio (CINR) (which may be implementation dependent), of the neighboring WiMAX and non-WiMAX RF sources radiating on all the RF channels within the pre-provisioned RF spectrum. In particular embodiments, the measurements may be executed on the preamble of the neighboring access stations. In certain embodiments, the RF scanning may be done passively (e.g., the fBS's RF transmitter is off). Regardless of the technique used to perform the RF scanning, in some embodiments, the results of the scan may be communicated to the WAP's SON server.

During, or after, the RF scanning the fBS may compare the measured RSSI or CINR values to an internal look-up table comprising normal RSSI or CINR operating values for each one of the analyzed RF channels. If a measured value for a particular RF channel exceeds the threshold value listed in the look-up table (e.g., there is too much interference), then the fBS may conclude that normal or acceptable RF operation is not desirable or possible using the respective RF channel. Conversely, if the measured values are below the listed values, then the fBS may conclude that RF operation is possible using the respective RF channel.

In some embodiments, the fBS may compare the measured values from RF scanning for all RF channels for which RF operation is possible to determine the best available RF channel (e.g., which RF channel has the least amount of noise and/or the strongest signal). If a better quality RF channel is available (compared to the RF channel initially provisioned at step 326) then, at step 330, the fBS may re-provision the RE and PHY parameters to use the improved RF channel.

At step 332 the fBS may determine whether RF operation is possible. In particular embodiments, this may include the fBS determining if any of the scanned RF channels comprised measured values below the listed threshold values. If the measured values for all RF scanned RF channels exceed the threshold values listed in the look-up table, the fBS may conclude that normal or acceptable RF operation is not possible in the local RF environment. The fBS may repeat the scanning a predetermined number of times before it concludes that RF operation is not possible. Once it has been determined that RF operation is not possible, the fBS may generate a critical alarm and exit the network entry procedure at step 302g.

Once the fBS has been provisioned with the best known RF channel, whether it is the initial provisioning or the second provisioning, and the fBS has determined that RF operation is possible, the fBS may turn on the RF transmission power on. Once the RF power has been turned on, the fBS NEM stage may be considered complete and the fBS may move to the SPA stage. The fBS may remain in the SPA stage until it is powered off or determines that maintenance or self-healing is required (see steps 340, 342, 348 and 350 below).

The SPA stage may, in essence, be considered the standard operating stage for the fBS. That is, once the fBS NEM stage has been completed, the fBS should for the most part, remain in the SPA stage as it communicates with any endpoints that may be connected thereto. During normal operation the fBS may use the SPA stage to manage its radio interference. This may allow for minimal degradation of the quality of service within a respective cell (e.g., the area covered by a particular mBS) when the fBS is turned on while also providing maximal increase in cell traffic capacity. The SPA stage may also allow for the dynamic installation and provisioning of the fBS with minimal or no assistance from the network operator following any changes in the RF environment surrounding the fBS.

In FIG. 3, the SPA stage operates as a cyclic process. In particular embodiments, this process may be continuously repeated. In some embodiments, the process may repeat at a pre-determined interval. In some embodiments, the SPA stage may operate under, or be triggered by, the WAP's network. In particular embodiments, prior to beginning the SPA stage, the fBS may turn the RF power on and use the RF and PHY parameters previously provisioned at steps 326 or 330. In particular embodiments, once the fBS enters the SPA stage, following the initial power-up of the RF transmitter of the respective fBS, the first few cycles of the SPA stage may be executed without the SON receiving any measurements (step 338). This may allow the RF environment map to be updated.

At step 334 SON processing is performed by the WAP's network. For example, the SON processing may be done by a SON server operated by the WAP providing the fBS with its wireless access. In particular embodiments, the SON may already be in operation prior to step 334. In certain embodiments, the work and/or responsibilities of the SON algorithm may be split between the fBS and the WAP's network. For example, the WAP's network may be responsible for providing real-time analysis of the RF environment of its associated access and relay stations. This analysis may allow for the WAP's network to generate and maintain a real time map or matrix of the network's RF environment. As may be apparent, in order for the analysis to be accurate the fBS may need to accurately execute direct or indirect measurements of its surrounding RF environment (e.g., at steps 328 and 338). For example, if the fBS is a WIMAX fBS, the surrounding RF environment may include WiMAX signals (from devices of the WAP and/or other WSPs) as well as non-WiMAX signals and other RF noise. The results may then be transmitted to a SON server operated by the WAP. The WAP may then use the RF environment map to make decisions for real-time re-provisioning of the fBS (as well as initial provisioning information) and/or any other access or relay stations for which it is responsible. If re-provisioning is needed, the results, and any related control data, may then be transmitted to the fBS.

Once the fBS has the information, it may then execute the control data in order to re-provision its PHY and RF parameters in accordance with the received information.

As alluded to above, in order for the SON algorithm to produce accurate results it may need to collect neighborhood discovery and monitoring information from neighboring mBSs, RSs, and fBSs. This information may be collected, at step 338. Depending on the embodiment, the information may be collected periodically and/or upon receiving a request from the WAP.

Based on this information, the SON algorithm may build and/or update a real time map of the network's RF environment. In doing so, related matrixes may indicate, for each access station entity (e.g., mBS, RS, fBS, etc.), the other access stations causing a detected RF impact upon the target access station. Based on the above real time RF environment map, the SON algorithm may request that the access stations within a particular cluster of cells be re-provisioned (e.g., given new RF/PHY/MAC parameters).

At step 336, based on the information provided by the SON algorithm, a decision is made as to whether a change may be needed to any PHY and/or RF parameters. If there is no need to make any changes, then at step 338 the fBS may perform RF scanning to search for any new or existing neighboring access stations at step 338 as discussed above. For each detected access station the fBS may detect and measure the preamble CINR, the RSSI, any related preamble PN sequences, and/or the MAC BSID. This information may then be sent to the WAP's network for inclusion in subsequent executions of the SON processing. While step 338 is depicted as being executed after determining that RF and/or PHY re-provisioning is not needed, this is not required. In particular embodiments, step 338 may be executed on a periodic basis irrespective of any re-provisioning determination.

On the other hand, if at step 336 re-provisioning is required then the fBS may initiate a self-check procedure at step 340 and begin a network assisted hand-over procedure at step 344 for any endpoints that may be connected to the fBS. Assuming that at step 342 it is determined that there is no maintenance required, the fBS may participate in the network assisted handover procedure. During the handover procedure, any endpoints served by the respective fBS may be requested to execute a handover to the same respective fBS based on the newly provisioned set of PHY and/or RF parameters. As can be seen in FIG. 3 the provisioning of the new parameters is performed at step 346. Step 346 may be completed prior to the actual hand-off of any of the endpoints serviced by the respective fBS.

If, at step 342, the fBS determines that maintenance is required, the fBS may enter a maintenance mode at step 348. In some situations the maintenance mode may be triggered by a maintenance flag raised by a request to perform certain scheduled or un-planned operations. Depending on the embodiment and/or situation the request may be generated locally (e.g., by a field engineer or after a periodic scan) or remotely (e.g., by the WAP's or WSP's network). Each WSP and/or fBS vendor may have different implementations for the maintenance mode.

If at step 340 the fBS fails its self-check, then the fBS may enter fBS self-healing mode at step 350. The fBS self-check may be included as a part of the cyclic SPA algorithm. The fBS may fail the self-check if it decides that it is operating outside of normal conditions. If so, a critical alarm may be raised and the fBS operation may be subject to a set of tests aimed at ascertaining the cause of the failure. Depending on the result of the self-healing operation and what has been ascertained as the cause of the failure at step 350 the fBS may returned to one of a variety of different steps, as can be seen in FIG. 3. In some embodiments, the fBS may enter the maintenance mode or self-Healing after any critical alarm.

FIG. 4 illustrates a method for implementing a wireless service connection, in accordance with a particular embodiment. The illustrated method comprises potential steps that may be used as part of step 316 (of FIG. 3) in certain embodiments. The method begins at step 410 where the fBS accesses an AAA server associated with the owner's WSP. The fBS may use IP address information stored within the fBS to access the AAA server. In some embodiments, access to the AAA server may be through a gateway, with the gateway then accessing the AAA server. The fBS may have stored therein an IP address associated with the gateway which it may use to access the gateway. In some embodiments, the fBS may also store a port number, username and/or password associated with the AAA server or gateway.

At step 420 the fBS authenticates itself. This may comprise the fBS transmitting its MAC address. The MAC address may be compared to a database of valid MAC addresses stored by the AAA server. In some embodiments, the MAC address may be carried by a X.509 certificate used during the authentication process. If device authentication fails, it may be retried, up to a predetermined number of attempts, before moving to a critical alarm at step 302c.

At step 430 the user is authenticated. This may be done to verify that the user's account is in good standing. If the fBS is not able to authenticate the user it may retry to authenticate the user, up to a predetermined number of attempts, before moving to a critical alarm at step 302c.

Once the fBS has established a connection with the network of the owner's WSP, the fBS may send its location ID to the owner's WSP. Then, at step 440, the owner's WSP may use the received location ID to verify that the reported location is within an area covered by, or associated with the owner's WSP (e.g., that the fBS is in an area that the WSP has licensed spectrum). If the location ID is covered, then the connection to the WSP is deemed a success and the method continues to step 320 discussed above with respect to FIG. 3.

If the location ID is not within an area associated with the owner's WSP, the owner's WSP may, at step 450, determine if the respective location ID is covered by another WSP who has a SLA with the owner's WSP. The WSP with a SLA with the owner's WSP may be referred to as a foreign WSP. If there is a foreign WSP, then the owner's WSP may provide any available access information (e.g., licensed RF channels, IP addresses of the security gateway and/or the AAA server, and/or any other related security parameters) for the foreign WSP's network. The fBS may use this information to connect to the foreign WSP's network. In some embodiments, if the fBS is attempting to authenticate with a foreign WSP's network, the foreign WSP may verify that the SLA credentials of the owner's WSP are still in good standing. The method may then proceed to wireless access connection at step 320, discussed above with respect to FIG. 3.

If the fBS is in an area that is not covered by the owner's WSP, or a valid foreign WSP (e.g., a WSP having an SLA with the owner's WSP), then the fBS may be in an area without a valid WAP and the owner's WSP may not validate the fBS. If the fBS is not validated by the owner's WSP the fBS may raise a critical alarm at step 302c and exit the network entry procedure. In certain embodiments, the fBS may make a predetermined number of attempts before raising the critical alarm and/or exiting the network entry procedure.

In some instances, testing or maintenance may be performed on the fBS. In such instances, device authentication step 420 may be bypassed at step 450 and/or user authentication step 430 may be bypassed at step 460. This may allow the method to proceed even though device authentication and/or user authentication failed.

FIG. 5 illustrates a method for implementing a wireless access connection, in accordance with a particular embodiment. The illustrated method comprises potential steps that may be used as part of step 320 (of FIG. 3) in certain embodiments. The method may begin once the fBS has successfully completed the wireless network connection step 316, discussed above. At step 510 the wireless access connection is authenticated. The wireless access connection for the fBS may be provided by the WAP (e.g., either the owner's WSP or a foreign WSP). At step 510 the fBS may access a SON server supported by the WAP. In particular embodiments, the fBS may access a femto ASN gateway to exchange security credentials. In some embodiments, the fBS may setup an IPSec connection or some other type of secure tunnel connection with the ASN gateway. This may allow for the exchange of data and control information.

At step 520 a set of operational parameters are received. These parameters may be provided by the WAP based on the location ID provided by the fBS and any other access station in the area. This may involve the fBS reporting its location ID.

At step 530 SON access information is downloaded. This may include providing the fBS with the respective-RF access channels and segmentation for the respective location. In particular embodiments, during authentication the WAP may send the fBS certain RF and PHY parameters. These parameters may be used by the fBS to start its initial operations. The RF channel parameters may help the fBS to narrow the range of its RF scan to only the allocated RF spectrum (e.g., 30 MHz) rather than the entire frequency band (e.g., 200 MHz). Reducing the RF spectrum to be scanned may speed up the RF scanning process, thereby reducing the amount of time it takes the fBS to complete the fBS NEM stage. In certain embodiments, the fBS may also receive initial RF power parameters from the WAP. This may affect the wireless range of the fBS and thus its impact on any neighboring access stations. Depending on the embodiment, the PHY parameters may include one or more of the Fast Fourier Transform (FFT) size, the downlink/uplink subframe ratio, segmentation, or the pseudo noise (PN) sequence.

Once the fBS has received the information for the wireless access connection, the method may continue to step 324 for network synchronization, discussed above with respect to FIG. 3.

Although particular embodiments have been described in detail, it should be understood that various other changes, substitutions, and alterations may be made hereto without departing from the spirit and scope of the present invention. For example, while the embodiment depicted in FIG. 3 includes a certain number of steps, depicted in a certain order, it is to be understood that other embodiments may have more, fewer or different steps, and the steps may be rearranged. For example, in an embodiment where the Location ID is to be determined based on a WiMAX BS triangulation procedure, then step 314 may be performed after the initial RF and PHY provisioning at step 326.

As another example, although an embodiment has been described with reference to a number of elements included within communication system 100 such as endpoints, fBSs, mBS, and RSs, these elements may be combined, rearranged or positioned in order to accommodate particular routing architectures or needs. In addition, any of these elements may be provided as separate external components to communication system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:

1. A method for implementing a self organizing network, comprising:
    establishing a connection between a femto base station and a network access device configured to provide the femto base station with Internet access;
    establishing a backhaul connection between the femto base station and a wireless service provider's network via the Internet;
    establishing a wireless connection between the femto base station and one or more endpoints via a radio frequency (RF) channel;
    transmitting, from the femto base station to the wireless service provider's network, neighborhood RF interference information via the backhaul connection, the neighborhood RF interference information associated with one or more other femto base stations from which the femto base station has received RF transmissions;
    receiving RF channel re-provisioning information for the wireless connection between the femto base station and the one or more endpoints from the wireless service provider's network;
    re-provisioning the RF channel; and
    participating in a hand-off procedure to hand-off the endpoints to the re-provisioned RF channel.

2. The method of claim 1, further comprising:
    conducting an RF scan to discover neighboring RF transmitting entities; and
    generating the neighborhood RF interference information based on the RF scan.

3. The method of claim 1, wherein participating in the hand-off procedure comprises receiving hand-off assistance from the wireless service provider's network.

4. The method of claim 1, further comprising, upon determining a maintenance flag has been raised indicating maintenance is needed, initiating a maintenance procedure.

5. The method of claim 4, further comprising receiving a maintenance request from the wireless service provider's network raising the maintenance flag.

6. The method of claim 1, further comprising initiating a self-check procedure.

7. A method for implementing a self organizing network, comprising:
    establishing a backhaul connection with a femto base station;
    receiving, from the femto base station, neighborhood radio frequency (RF) interference information via the backhaul connection, the neighborhood RF interference information associated with one or more other femto base stations from which the femto base station has received RF transmissions;
    based on the neighborhood RF interference information, creating an RF environment map;
    determining whether the femto base station is to re-provision its RF channel with one or more endpoints based on the neighborhood RF interference information; and
    upon determining that the femto base station is to re-provision its RF channel:
        transmitting information indicative of the re-provisioning of the RF channel with the one or more endpoints to the femto base station; and
        participating in a hand-off procedure to hand-off any endpoints currently connected to the femto base station to the re-provisioned femto base station.

8. The method of claim 7, wherein the backhaul connection is established via a public network.

9. The method of claim 7, further comprising receiving, from a macro base station, neighborhood RF interference information via a private network.

10. The method of claim 7, further comprising transmitting a maintenance request to the femto base station requesting the femto base station to perform self maintenance.

11. The method of claim 7, wherein the RF environment map comprises a matrix of interference values indicative of an interference experienced by the femto base station from any RF source indicated in the neighborhood RF interference information received from the femto base station.

12. A device for implementing a self organizing network, comprising:
    a first interface configured to:
        establish a connection between a femto base station and a network access device configured to provide the femto base station with Internet access;
        establish a backhaul connection between the femto base station and a wireless service provider's network via the Internet;
        transmit, from the femto base station to the wireless service provider's network, neighborhood RF interference information via the backhaul connection, the neighborhood RF interference information associated with one or more other femto base stations from which the femto base station has received RF transmissions; and
        receive RF channel re-provisioning information from the wireless service provider's network;
    a second interface, coupled to and different than, the first interface, the second interface configured to establish a wireless connection with one or more endpoints via a radio frequency (RF) channel; and
    a processor coupled to the first and second interfaces and configured to:
        re-provision the RF channel with the one or more endpoints; and
        participate in a hand-off procedure to hand-off the endpoints to the re-provisioned RF channel.

13. The device of claim 12, wherein the second interface is further configured to:
    conduct an RF scan to discover neighboring RF transmitting entities; and
    generate the neighborhood RF interference information based on the RF scan.

14. The device of claim 12, wherein the processor configured to participate in the hand-off procedure is further configured to receive hand-off assistance from the wireless service provider's network.

15. The device of claim 12, wherein:
    the first interface is further configured to receive a maintenance request from the wireless service provider's network; and
    the processor is further configured to initiate a maintenance procedure.

16. A device for implementing a self organizing network, comprising:

an interface configured to:

establish a backhaul connection with a femto base station; and receive, from the femto base station, neighborhood radio frequency (RF) interference information via the backhaul connection, the neighborhood RF interference information associated with one or more other femto base stations from which the femto base station has received RF transmissions; and a processor coupled to the interface and configured to:

based on the neighborhood RF interference information, create an RF environment map; and determine whether the femto base station is to re-provision its RF channel with one or more endpoints based on the neighborhood RF interference information,;

wherein, upon determining that the femto base station is to re-provision its RF channel with the one or more endpoints:

the interface is further configured to transmit information indicative of the re-provisioning of the RF channel with the one or more endpoints to the femto base station; and the processor is further configured to participate in a hand-off procedure to hand-off any endpoints currently connected to the femto base station to the re-provisioned femto base station.

17. The device of claim 16, wherein the backhaul connection is established via a public network.

18. The device of claim 16, wherein the interface is further configured to receive, from a macro base station, neighborhood RF interference information via a private network.

19. The device of claim 16, wherein the interface is further configured to transmit a maintenance request to the femto base station requesting the femto base station to perform self maintenance.

20. The device of claim 16, wherein the RF environment map comprises a matrix of interference values indicative of an interference experienced by the femto base station from any RF source indicated in the neighborhood RF interference information received from the femto base station.

* * * * *